Patented Mar. 3, 1931

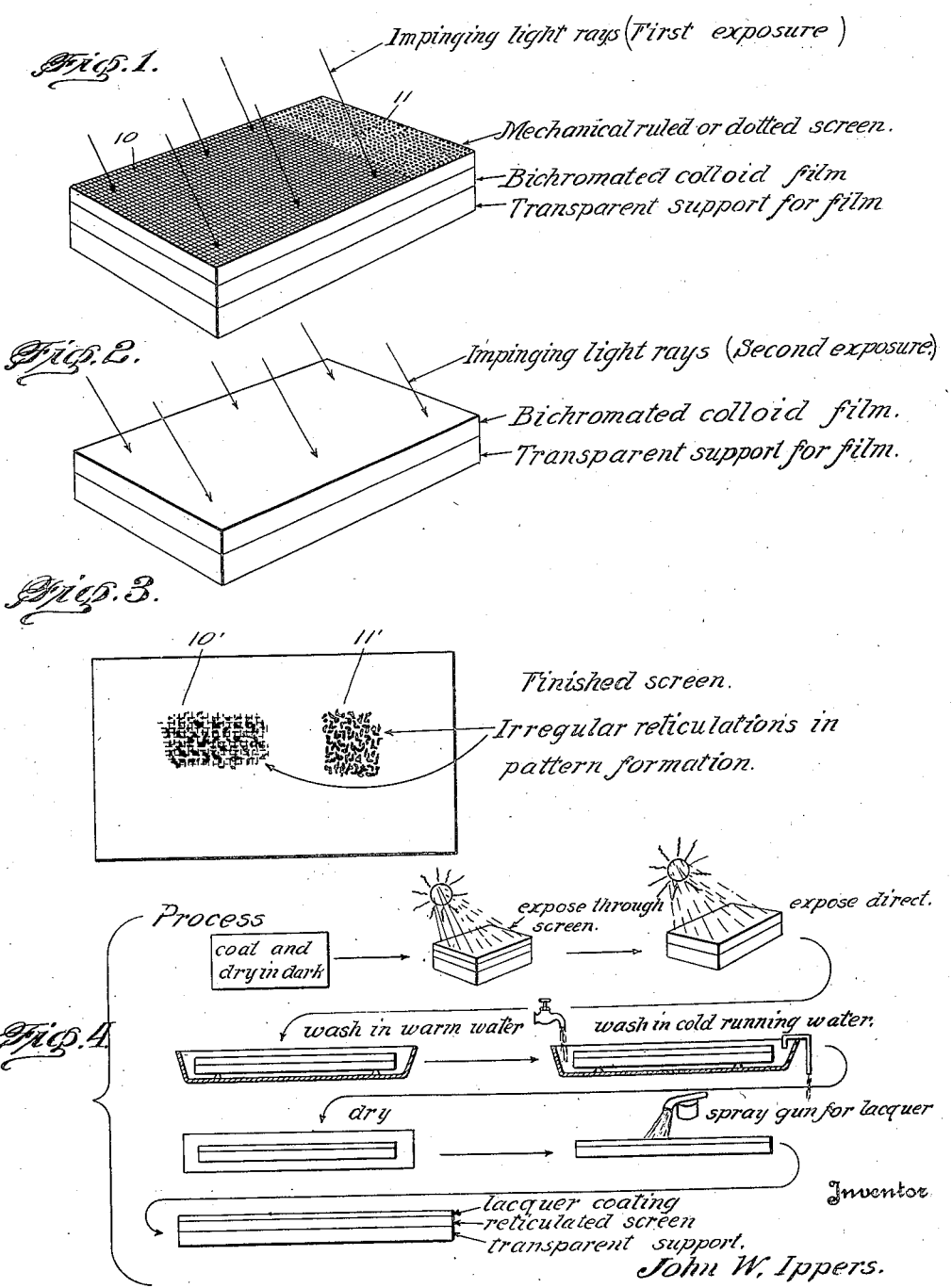

1,794,693

UNITED STATES PATENT OFFICE

JOHN W. IPPERS, OF CHICAGO, ILLINOIS, ASSIGNOR OF ONE-HALF TO JOSEPH DEUTSCH, OF CHICAGO, ILLINOIS

SCREEN EMPLOYED IN PHOTO-ENGRAVING AND METHOD FOR MAKING THE SAME

Application filed July 11, 1929. Serial No. 377,617.

This invention relates to screens for use in connection with processes of photo-engraving, and method for making the same.

More particularly, this invention has reference to a method of producing what may be termed properly a "two-tone" or "double-tone" screen for photo-engraving work, comprising a surface coating on a transparent backing member such as a glass plate or transparent film having a mechanically formed stipple or other perfect or regular grain superposed on an irregular grain inherent in the coating after development thereof.

In the present-day photo-engraving processes it is customary to employ a screen in order to break up the image into a number of individual dots, or other small image areas, whereby it becomes possible to produce color effects by printing from a number of plates, each with a different colored ink, depending upon the blending of the colors in the human eye to produce tints and tones intermediate between those of the inks actually used.

In the past it has been customary to employ screens that are produced by mechanically ruling on a suitable backing by means of a diamond point so as to produce a screen having regularly spaced transparent places which, when using the screen as a negative, reproduce as minute but regularly spaced dots. Such screens may be of any desired degree of fineness, but even when used as fine as 180 dots per inch, reproductions made therewith lack vitality and vigor and the prints made therefrom appear more or less dull and do not quite reproduce the full brilliance of the original.

According to the present invention, a screen is produced which, instead of the regularly spaced dots, consists of a large number of irregular lines comparatively short and running in every conceivable direction, upon which there is superimposed the regular screen having the usual regularly spaced dots, whereby greatly improved results are obtained.

For example, in accordance with my invention I am able to produce either three or more colored printing reproductions in color of highly intricate colored designs such as flowers, rugs, and colored scenery, which have a lifelike appearance hitherto unobtainable by the art of either plate or offset printing. This result I ascribe to the fact that the screen as produced by me breaks up the image into a vast number of irregular areas too small to be seen with the naked eye, but nevertheless of such configuration that if, for example, an intermediate tone such as green is desired, this will readily be reproduced from yellow and blue without the individual yellow and blue components being visible to the naked eye as such. This blending of the colors is a particular advantage inherent in screens produced in accordance with my improved process.

One of the objects of my invention is to produce by chemical means a basic screen-plate coated with an emulsion which has the peculiar property, on development, of yielding a screen consisting of minute depressions and elevated portions, or as I prefer to term them, "incises" or lenticular areas. These incises run approximately at right angles to each other and are produced purely by the development of the plate after exposure, as will be hereinafter more completely set forth. A patent on a method of producing such an emulsion has already been granted to Wilma Eppers, U. S. Patent No. 1,234,888, on July 31, 1917, and the formula disclosed in said patent is suitable for the purpose of the present inventions.

By my present invention, however, I produce in addition to the natural incises, the regularly spaced dots of the standard half-tone screen, which by being superimposed upon the irregular incises, produce the finished screen that I desire to protect by Letters Patent.

An additional feature of my invention involves the filling of the depressions or incises in the screen with an opaque coloring matter, for example ink, so as to enhance the screening effect, and to give greater depth to reproductions made with its assistance. The screen texture produced in finished printing plates by the use of the screen made in accordance with my present invention permits the use of varnish colors of substantial body in place of the ordinary rotogravure aniline inks, whereby a much more brilliant finished picture is produced.

The invention is illustrated in the drawing forming a part of this specification. The drawing represents the various steps as well as the product; Fig. 1 showing the first exposure step through a screen;

Fig. 2 showing the second exposure step;

Fig. 3 showing a plan-view of the screen; and

Fig. 4 being a flow-sheet of the process.

Broadly speaking, my invention comprises the coating of a transparent flat supporting surface, as, for example a piece of crystal plate glass, with an emulsion consisting of a hardenable colloid, such as gelatin, with which has been incorporated a bichromate and other chemicals that, on exposure to light, will render said gelatin substantially insoluble in water. The degree of insolubilization of the gelatin is a function of the degree of exposure, and if the exposure is carried far enough, especially in the presence of some of the ingredients hereinafter recited, the film of gelatin will swell and buckle at those places where the light action has been least, and thereupon when washed with warm water, will tend to dissolve at those points so that the gelatin layer at that point becomes thinner. When such a plate is afterwards dried, the places where the gelatin layer has been thinnest will be somewhat below the surface of the balance of the film whereby it becomes possible to deposit ink in these incises or depressions and by rubbing off the plate, to remove the ink from every other part of the gelatin except in the said incises.

As an example of carrying out my invention, a clear, preferably crystal plate glass, is thoroughly cleaned as, for example, by washing with ammonium hydroxide and finely granulated plaster of Paris or chalk. The plate is then rinsed with warm clear water and thoroughly dried. The cleaned plate is next placed in a drying oven, with the upper surface thereof disposed perfectly horizontal with the aid of a spirit level, and heated to a temperature of 100° Fahr.

A coating of a light-sensitive emulsion is next applied to the level surface of the plate, the coating being in liquid form and the surplus being permitted to drain therefrom, leaving a uniform film thereover. The plate is kept at a temperature of 100° F., and the emulsion is permitted to dry, this phase taking about three or four hours. All of these operations are performed in the dark. I find that a suitable emulsion is described in U. S. Letters Patent No. 1,234,888 issued July 31, 1917, to Wilma Eppers, the emulsion consisting of 6 ounces of gelatin, 2 ounces of potassium bichromate, 4 drams of potassium ferrocyanide, 2 drams of ammonia water, 2 drams of chromic acid and 44 ounces of water.

The plate thus produced is placed in a printing frame with any desired mechanical screen as a negative in close proximity thereto and is exposed through said negative to natural or artificial light for from 5 to 10 minutes, whereafter the screen is removed and the plate alone is exposed to the natural or artificial light for another period of from 5 to 10 minutes, or until the emulsion turns a desired light brown color. The plate is then placed in a bath of luke warm clear water for about a half hour, whereafter the plate is washed in cold, clear, preferably filtered, running water 5 or 6 hours to wash out the chemicals remaining in the emulsion.

The action of the light when first acting upon the emulsion through the mechanical dotted screen negative insolubilizes the gelatin in the emulsion at such points where the light passes through the negative. In other words, the effect is somewhat as though this part had been rendered quite insoluble. The second exposure, without the negative, insolubilizes the remainder of the gelatin in the film, and of course still further hardens those portions which had been struck by whatever light had traversed the negative during the first exposure. When this plate is thereafter developed in warm water, the parts which have been affected by light both during the first, as well as the second exposure, will swell the least, whereas those parts that have only been exposed during the second exposure will swell somewhat more. None of the gelatin, however, will completely dissolve. When afterwards this plate is given the usual prolonged washing and soaking, whereby all soluble chemicals are removed, and is then dried, the parts of the plate that receive only the second exposure will form the required incises or reticulations, whilst the dots are also represented in the screen by still deeper depressions in the gelatin film. The result is the combination of the copy of the mechanical half-tone screen in connection and combination with the reticulations and incises produced in the gelatin by the effect of the light and the chemicals.

The plate thus produced is ready for use for most purposes, but if desired, an opaque ink, preferably formed in linseed oil, lamp black and turpentine, is rubbed over the plate so that some of the color remains in the incises of the grain. The plate is left to dry for several days in a warm temperatured drying oven of about 90° to 100° F. This action may be repeated several times until the incises are filled to a desired depth. A protective covering of a clear celluloid solution is applied over the plate to prevent marring of the emulsified surface by water or oils used in the photo-engraving process. Also, this protective covering of a cellulose ester solution, varnish or the like, prevents scratching or rubbing of the emulsified surface. The plate is now in readiness for use as a screen for the many processes by which a photograph may be made to afford a plate from which can be taken prints in ink corresponding to the original of the photographic image.

As a result of the process disclosed in the present invention, a screen for photo-engraving work is produced which has the effect of a rotogravure process by the provision of a combination of chemically and mechanically formed incises in a coating formed on a transparent backing member, the chemically formed incises resulting from the action of the chemicals in the emulsion and the mechanically formed incises resulting from the exposure of a negative screen onto said emulsion. The incises or grain in the coating may be rubbed down with an opaque black ink to give a desired depth to the reproduction. The texture of the screen is such that the screen is not visible to the naked eye, thereby having the effect of a full-tone reproduction. Color blending in the reproduction is accomplished in a manner to reproduce the natural beauty of the image and varnish colors may be employed to give life and brilliance thereto.

A second exemplification of my invention comprises combining the natural reticulations produced in a developed chromated gelatin film, as above described, with a mechanically produced irregular screen formed by scratching the surface of a metal or glass plate with fine, hard emery or carborundum powder, preferably graded as to the size of grains therein. Such a metallic or glass plate, for example, when rubbed with graded emery, has formed on its fairly regular circular intersecting scratches. These scratches may then afterwards be filled with ink and the surfaces of the plate wiped off, whereupon it is possible to transfer the ink in these scratches or depressions to a smooth surface by employing a rubber or similarly resilient roller which is passed over the plate and picks up the ink out of the depressions. If the roller is subsequently passed over a smooth surface, it will deposit thereon the ink picked out of the depressions, thereby reproducing the same pattern on the said smooth surface. This method is quite analogous to that used in graining painted surfaces; for example, in using such a method I first produce my naturally reticulated chromated gelatin screen plate by merely coating a smooth piece of glass with the emulsion already described, followed by its exposure to light and development with warm water and washing with cold water. After this plate is dried, I may then transfer to its surface a screen outlined in ink or color, as, for example, one taken from a scratched or grained metallic plate by means of a rubber roller or its equivalent, as just described immediately above. This will produce a double-tone or double-effect screen which possesses both the natural reticulations of the gelatin and the intersecting lines transferred from the grained plate. I may then, after the ink transferred thereto has dried, also additionally ink the depressions or incises of the gelatin, thus producing still further modifications in the precise design of the screen.

I wish it to be distinctly understood that all of the reticulations, incises or other portions of the screen are of such dimensions as to be invisible to the naked eye but readily detectable by means of a magnifying glass. In using the screen such as that produced by me, the same is employed by placing it in the frame with its smooth side toward the source of light and its screened or grained surface away from the source of light. Immediately in contact with the grained surface of the screen there is placed the usual negative and then the sensitized metallic plate, for example, a copper plate coated with an emulsion of fish-glue and ammonium bichromate. After suitable exposure, the metallic plate is removed and developed by warm water and dried, after which it is etched in the usual manner by means, for example, of a solution of ferric chloride or its equivalent. Those familiar with the art of photo-engraving will realize that by this procedure there will be transferred to the metallic plate all of the details of the negative, having, however, the high-lights thereof broken up into individual image areas corresponding to the transparent portions of the screen. Inasmuch as these transparent portions of my improved screen are irregular in outline and shape, a much greater fidelity in reproduction is accomplished, this being especially true of multi-color work.

An obvious alternative is to proceed as follows:—

Coat a glass plate with the already described gelatin-bichromate emulsion, drying the same in the dark. Take a screen negative produced by transferring the ink from depressions in a grained metal or glass plate onto another piece of glass and dried thereon, and expose the dried coated plate through said negative; remove said negative and again expose the plate. Thereupon soak said plate in warm water and then wash it in the manner already described. The result will be a screen-plate having both the reproduction of the grained plate negative plus the natural reticulations or incises of the gelatin emulsion, thus producing still a third type of double-tone screen.

The essential feature of my invention lies in the superimposition, upon an emulsion having the inherent properties of forming a reticulated screen of a mechanically produced dotted or line screen, so as to obtain the benefits of both in a single screen plate.

In order that my invention may be more readily comprehended, I have submitted as part of the present application a set or drawings depicting the process and the product obtained thereby. These drawings show the following:—

Fig. 1 is a perspective view of a mechanical screen plate lying on the colloid-emulsion-coated transparent support while undergoing the first exposure to light, the light passing through the screen onto the colloid emulsion. In this figure the screen surface is shown greatly enlarged so as to make it visible on the drawing, and shows two modifications; the area 10 being provided with a regular mechanical ruled screen while the area 11 is shown provided with a regular evenly spaced series of dots; both modifications being within the scope of my invention.

Fig. 2 shows the colloid emulsion undergoing the second exposure over its entire surface without the intervention of the mechanical screen. Fig. 3 represents a plan view of my finished screen depicting, on a very greatly enlarged scale, the reticulations as they appear under a microscope, the area 10′ showing how the screen appears when illuminated during the first exposure through a ruled screen, and the area 11′ as it appears when a dotted mechanical screen is used.

Fig. 4 shows in diagrammatical-illustrative form the preferred sequence of the steps in the process, being on the order of a flowsheet, and being self-explanatory when taken in conjunction with the description in the specification hereinabove.

While but a few embodiments of this invention are herein shown and described, it is to be understood that various modifications may be apparent to those skilled in the art without departing from the spirit and scope of this invention, and therefore, the same is to be limited only by the scope of the prior art and the appended claims.

I claim:

1. The method of forming a patterned irregularly reticulated hardened colloid screen for photoengraving and the like which comprises exposing a bichromated colloid layer to actinic rays at predetermined areas, again exposing the same to light in its entirety, and thereupon causing swelling and reticulation in said layer by development thereof with colloid-swelling liquids, followed by washing and drying of the film.

2. The method of forming a patterned irregularly reticulated hardened colloid screen for photoengraving and the like which comprises coating a transparent support with a bichromated gelatin film, exposing the film to light through means intercepting the light at predetermined areas, thereupon exposing the film a second time to light in its entirety, washing said film in warm water to effect selective reticulation thereof in a pattern substantially influenced by the areas doubly illuminated, then washing the reticulated film to remove chemicals therefrom, and drying the same.

3. The method of forming a screen which consists in coating a transparent backing member with a light sensitive bichromated colloid emulsion, exposing the same to light through a mechanically formed screen, then exposing the emulsion to light without said screen, then in developing said emulsion with warm water to wash out the soluble portions thereof.

4. A screen for photo-engraving and the like comprising a transparent supporting member and a screen supported thereby, said screen comprising hardened gelatin having irregular reticulations thereon arranged in a substantially regular manner.

5. A screen for photoengraving and the like comprising a colloid surface having irregular reticulations thereon arranged in a substantially regular pattern formation.

6. A screen for photoengraving and the like comprising a proteid surface having irregular reticulations thereon arranged in a substantially regular pattern formation.

7. A screen for photoengraving and the like comprising a gelatin surface having irregular reticulations thereon arranged in a substantially regular pattern formation, said reticulations being controlled by areas of gelatin relatively harder than other areas of gelatin, whereby the reticulated effect is more pronounced in the softer than in the harder areas.

8. A screen for photoengraving and the like consisting of a transparent support and an insolubilized proteid coating provided with irregular lenticular reticulations arranged in a substantially regular pattern so as to combine the effects of a purely reticulated and a purely mechanical line or dot screen.

9. The process of producing a half-tone screen which comprises coating a transparent support with an emulsion produced from gelatin, potassium bichromate, potassium ferrocyanide, ammonium hydroxide and chromic acid, drying said emulsion, exposing the same to actinic light through a regular mechanically-produced screen for from five to ten minutes, exposing a second time directly to actinic light without the screen for a similar period, then placing said film in warm water for about thirty minutes, then washing said film for about six hours in cold water, drying the same, and coating the same with a water-insoluble varnish.

In witness whereof, I have hereunto subscribed my name.

JOHN W. IPPERS.